United States Patent
Senkbeil, Jr. et al.

(10) Patent No.: US 12,403,420 B2
(45) Date of Patent: *Sep. 2, 2025

(54) FILTER AND FILTER ASSEMBLY FOR PAINT OVERSPRAY CAPTURE

(71) Applicant: PaintMaxx LLC, Jasper, GA (US)

(72) Inventors: Paul H. Senkbeil, Jr., Big Canoe, GA (US); Hollis Dwayne Cook, Warrior, AL (US)

(73) Assignee: PaintMaxx LLC, Jasper, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,098

(22) Filed: Jul. 1, 2024

(65) Prior Publication Data

US 2024/0350960 A1    Oct. 24, 2024

Related U.S. Application Data

(63) Continuation of application No. 18/223,603, filed on Jul. 19, 2023, now Pat. No. 12,023,620, which is a
(Continued)

(51) Int. Cl.
*B01D 46/52* (2006.01)
*B01D 46/00* (2022.01)
(Continued)

(52) U.S. Cl.
CPC ....... *B01D 46/523* (2013.01); *B01D 46/0005* (2013.01); *B01D 46/0043* (2013.01);
(Continued)

(58) Field of Classification Search
CPC .... B01D 46/521; B01D 46/523; B01D 46/58; B01D 46/0002; B01D 46/0005;
(Continued)

(56) References Cited

U.S. PATENT DOCUMENTS 2,058,669 A    10/1936   Dollinger
3,992,173 A *  11/1976   Wharton ............ B01D 46/0016
                                                      55/501
(Continued)

FOREIGN PATENT DOCUMENTS

DE    102016106699 A1    10/2017
EP        3354353 B1      6/2023
(Continued)

OTHER PUBLICATIONS

U.S. Appl. No. 11/745,132, filed Mar. 15, 2011, Fukuhara et al.
(Continued)

*Primary Examiner* — Robert Clemente
(74) *Attorney, Agent, or Firm* — TROUTMAN PEPPER LOCKE LLP; James E. Schutz; Korbin M. Blunck

(57) ABSTRACT

The disclosed technology includes an air filter box for filtering particulates from air. The air filter box can include a filter media pack having a filter layer and a plurality of filter media supports configured to support the filter layer. The air filter box can also include a filter housing having an inlet, an outlet, and a plurality of support tabs configured to align and support the filter media pack inside of the filter housing. The filter media pack can be configured to be folded and placed inside of the housing for cooperative engagement with the support tabs. The filter box can be configured to channel a mixture of air and particulates from the inlet, through the filter media pack, and out the outlet to create filtered air.

20 Claims, 9 Drawing Sheets

Related U.S. Application Data continuation of application No. 16/952,792, filed on Nov. 19, 2020, now Pat. No. 11,745,132.

(60) Provisional application No. 63/032,123, filed on May 29, 2020, provisional application No. 62/938,165, filed on Nov. 20, 2019.

(51) Int. Cl.
*B01D 46/58* (2022.01)
*B05B 16/60* (2018.01)

(52) U.S. Cl.
CPC .............. *B01D 46/58* (2022.01); *B05B 16/60* (2018.02); *B01D 2265/04* (2013.01); *B01D 2265/06* (2013.01); *B01D 2275/10* (2013.01)

(58) Field of Classification Search
CPC ............ B01D 2265/04; B01D 2265/06; B01D 2275/10; B01D 46/0043; B01D 46/0016; B05B 16/60; B05B 14/43
See application file for complete search history.

(56) References Cited

U.S. PATENT DOCUMENTS

| | | | |
|---|---|---|---|
| 4,561,587 A * | 12/1985 | Wysocki | B01D 46/023 55/501 |
| 4,617,122 A | 10/1986 | Kruse et al. | |
| 5,332,409 A | 7/1994 | Dralle | |
| 5,782,944 A | 7/1998 | Justice | |
| 5,840,094 A | 11/1998 | Osendorf et al. | |
| 5,989,303 A | 11/1999 | Hodge | |
| 6,152,980 A | 11/2000 | Culwell | |
| 6,159,318 A | 12/2000 | Choi | |
| 6,165,240 A * | 12/2000 | Hodge | B01D 46/0036 55/497 |
| 6,723,150 B2 | 4/2004 | Parker | |
| 8,105,425 B2 | 1/2012 | Ptak et al. | |
| 8,343,251 B2 | 1/2013 | Ptak et al. | |
| 8,491,689 B2 | 7/2013 | Duffy et al. | |
| 8,641,794 B2 | 2/2014 | Gillilan | |
| 9,320,998 B2 | 4/2016 | Gillilan | |
| 9,481,004 B2 | 11/2016 | Vickers et al. | |
| 9,555,358 B2 | 1/2017 | Haufe et al. | |
| 9,943,796 B2 | 4/2018 | Ptak et al. | |
| 9,993,835 B2 | 6/2018 | Slama et al. | |
| 10,124,317 B2 | 11/2018 | Baldinger | |
| 10,155,431 B2 | 12/2018 | Luley et al. | |
| 10,427,077 B2 | 10/2019 | Baldinger | |
| 10,596,585 B2 | 3/2020 | Slama et al. | |
| 11,014,113 B2 | 5/2021 | Slama et al. | |
| 11,819,792 B2 | 11/2023 | Gillilan | |
| 2004/0163370 A1 | 8/2004 | Haufe et al. | |
| 2004/0182055 A1 | 9/2004 | Wynn | |
| 2005/0204714 A1 | 9/2005 | Sundet et al. | |
| 2005/0224170 A1 * | 10/2005 | Shearin | B01D 46/0005 156/293 |
| 2006/0053759 A1 | 3/2006 | Winters et al. | |
| 2007/0204574 A1 * | 9/2007 | Workman | B01D 46/0016 55/495 |
| 2007/0294988 A1 * | 12/2007 | Miller | B01D 46/0002 55/501 |
| 2010/0192528 A1 | 8/2010 | Mann et al. | |
| 2010/0300052 A1 | 12/2010 | Porter | |
| 2014/0298764 A1 | 10/2014 | Haufe et al. | |
| 2019/0046910 A1 * | 2/2019 | Gregerson | B01D 46/10 |
| 2019/0217239 A1 | 7/2019 | Gregerson et al. | |
| 2019/0344209 A1 | 11/2019 | Hein et al. | |
| 2020/0129907 A1 | 4/2020 | Fox et al. | |
| 2022/0176308 A1 | 6/2022 | Gaur et al. | |

FOREIGN PATENT DOCUMENTS

| | | |
|---|---|---|
| JP | 2001046824 A | 2/2001 |
| WO | 2019020308 A1 | 1/2019 |
| WO | 2022046698 A1 | 3/2022 |

OTHER PUBLICATIONS

Paint Mist/Exhaust Fliter, http://www.shwfilter.com/paint-mist-exhaust-filter/sticky-multi-layer.html.

Paint Mist/Exhaust Fliter, http://www.shwfilter.com/paint-mist-exhaust-filter/paint-collector.html.

Freudenberg Innovating Together, edrizzi Vario fine, medium and coarse, https://products.freudenberg-filter.com/en/p/products/filter-mats/paint-mist-arrestors/edrizzi.

* cited by examiner

FILTER AND FILTER ASSEMBLY FOR PAINT OVERSPRAY CAPTURE

CROSS REFERENCE TO RELATED APPLICATIONS

This application is a continuation of, and claims priority under 35 U.S.C. § 120 to, U.S. Non-Provisional patent application Ser. No. 18/223,603 filed Jul. 19, 2023, which is a continuation of U.S. Non-Provisional patent application Ser. No. 16/952,792 filed Nov. 19, 2020 which claims priority to U.S. Provisional Patent Application No. 62/938,165 filed 20 Nov. 2019 and U.S. Provisional Patent Application No. 63/032,123 filed 29 May 2020, the contents of which are incorporated herein by reference in their entirety as if set forth verbatim.

FIELD OF TECHNOLOGY

The present disclosure relates generally air filters and filter assemblies for filtering particulates from air and, more particularly, for filtering paint particulates from air.

BACKGROUND

For centuries paint has been used to protect and beautify materials. Traditionally, paint is applied to a surface using a paintbrush, roller, or other device which soaks up the paint and then applies it to the surface by physical contact. However, a more recent method of painting utilizes compressed gasses (e.g., compressed air, propane, butane, isobutane, methyl ethyl, nitrous oxide, or carbon dioxide, etc.) to create an aerosol mixture of paint particles and gas to apply paint to a surface. The resultant aerosol mixture is propelled from a spray device and the paint particles are applied to the surface in a constant stream allowing the user to rapidly apply paint to a surface. Although this form of painting may save time, and potentially create better finishes, there are dangers associated with using this painting method including inhaling toxic fumes and paint particulates.

To reduce the danger of inhaling toxic fumes and paint particulates, various methods of filtering out the toxic particulates from the air have been developed. For example, air filtration systems help to reduce harmful particulates in the air. Furthermore, designated paint booths can be used to isolate the area where paint fumes may exist from other areas where one would expect clean air. Air filtration systems are used to provide a fresh supply of breathable air to the painters inside the paint booth and filter out particulates from air exiting the paint booth.

To capture the harmful fumes and particulates exiting a paint booth, various types of filters are used. One type of filter comprises a rectangular (e.g., a square) box-shaped filter which has filter media placed inside of the filter box to capture paint particulates and allow filtered air to exit to the atmosphere or be recirculated through the air filtration system. The box filter can be disposed once it has reached the end of its usable life. Many current designs of box filters utilize a series of cardboard baffles or shredded paper for filter media. However, these designs tend to prematurely clog up the entrance of the filter rather than utilize the entire filter media available leading to an ineffective use of the filter media. Furthermore, these designs are cumbersome to assemble causing the user frustration and increasing the margin for error in the assembly of the filter. Therefore, the present invention is directed to an improved paint box filter using alternative filter media which can effectively capture particulates and reduce the amount of time required to assemble the paint filter.

SUMMARY

The disclosed technology relates generally to filters and filter assemblies for capturing paint overspray.

The disclosed technology can include an air filter box for filtering particulates from a mixture of air and particulates. The air filter box can include a filter media pack configured to receive a mixture of air and particulates and filter at least a portion of the particulates from the mixture of air and particulates to create filtered air. The filter media pack can include a filter layer configured to filter at least a portion of the particulates from the mixture of air and particulates and a plurality of filter media supports configured to provide support to the filter layer.

The filter box can also include a filter housing configured to receive and support the filter media pack. The filter housing can include an inlet configured to receive the mixture of air and particulates, an outlet configured to receive the filtered air from the filter media pack and release the filtered air out the outlet, and a plurality of support tabs configured to align and support the filter media pack inside of the filter housing. The filter media pack can be configured to be folded and placed inside of the filter housing for cooperative engagement with the support tabs. Furthermore, the air filter box can be configured to channel the mixture of air and particulates from the inlet, through the filter media pack, and out the outlet to create the filtered air.

The filter layer can be a first filter layer configured to filter at least a first portion of the particulates from the mixture of air and particulates and the air filter box can further include a second filter layer affixed to the first filter layer that can be configured to filter at least a second portion of the particulates from the mixture of air and particulates. The first filter layer can be thermally bonded to the second filter layer.

The plurality of filter media supports can be located between the first filter layer and the second filter layer. The plurality of filter media supports can also include a plurality of perforations configured to channel the mixture of air and particulates through the first filter layer and the second filter layer at the plurality of perforations to create the filtered air. Alternatively, or in addition, the plurality of filter media supports can form a gap between adjoining filter media supports such that the plurality of filter media supports channel the mixture of air and particulates through the first filter layer and the second filter layer at the gap to create the filtered air.

The filter media pack can be configured to form a friction fit seal at an interface between the filter media pack and the filter housing. The friction fit seal can be configured to prevent the mixture of air and particulates from being directed around an outer edge of the filter media pack.

The filter housing can be configured to be folded from a relatively flat state to a deployed state. The plurality of support tabs can include inlet guide fingers configured to support and align the filter media pack inside of the filter housing. The inlet guide fingers can be configured to fold inwardly from a top and bottom of a front outer wall of the filter housing to, at least partially, form the inlet. The plurality of support tabs can include inlet support tabs configured to align and support the filter media pack inside of the filter housing. The inlet support tabs can be configured to fold inwardly from a side of a front outer wall of the filter housing to, at least partially, form the inlet. The plurality of support tabs can include outlet guide fingers configured to support and align the filter media pack inside of the filter housing. The outlet guide fingers can be configured to fold inwardly from a top and bottom of a rear outer wall of the filter housing to, at least partially, form the outlet. The plurality of support tabs can include outlet support tabs configured to support the filter media pack inside of the filter housing. The outlet support tabs can be configured to fold inwardly from a side of a rear outer wall of the filter housing to, at least partially, form the outlet. The filter layer can include lofted polyester.

The disclosed technology can include an air filter assembly. The air filter assembly can include a plurality of air filter boxes. Each air filter box can include a filter media pack configured to receive a mixture of air and particulates and filter at least a portion of the particulates from the mixture of air and particulates to create filtered air. The filter media pack can include a filter layer configured to filter at least a portion of the particulates from the mixture of air and particulates. The filter media pack can include a plurality of filter media supports configured to provide support to the filter layer.

Each filter box can further include a filter housing configured to receive and support the filter media pack. The filter housing can include an inlet configured to receive the mixture of air and particulates and an outlet configured to receive the filtered air from the filter media pack and release the filtered air out the outlet. The filter media pack can be configured to be folded and placed inside of the filter housing. The air filter box can be configured to channel the mixture of air and particulates from the inlet, through the filter media pack, and out the outlet to create the filtered air.

The air filter assembly can include a filter assembly housing configured to receive and support the plurality of air filter boxes. The filter assembly housing can include an air filter assembly inlet configured to receive the mixture of air and particulates and channel the mixture of air and particulates toward the plurality of air filter boxes. The filter assembly housing can include an air filter assembly outlet configured to receive the filtered air from the plurality of air filter boxes and channel the filtered air out the air filter assembly outlet. The filter assembly housing can be configured to channel the mixture of air and particulates through the plurality of the air filter boxes simultaneously.

The air filter assembly can include a first air filter box that can be offset a distance from a second air filter box such that a distance between the inlet of the first air filter box and a wall of the filter assembly housing is greater than a distance between the inlet of the second air filter box and the wall of the filter assembly housing. The first air filter box can be nearer the filter assembly inlet than the second air filter box.

The air filter assembly inlet can include a sloped edged configured to channel the mixture of air and particulates toward the plurality of air filter boxes. The air filter assembly can include one or more air deflectors configured to channel the mixture of air and particulates through the plurality of air filter boxes. The air filter assembly can include reinforcing tabs configured to receive a restraint device of an air filtration system. The air filter assembly inlet can be located proximate a top surface of the air filter assembly and the air filter assembly outlet can be located proximate a back surface of the air filter assembly.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
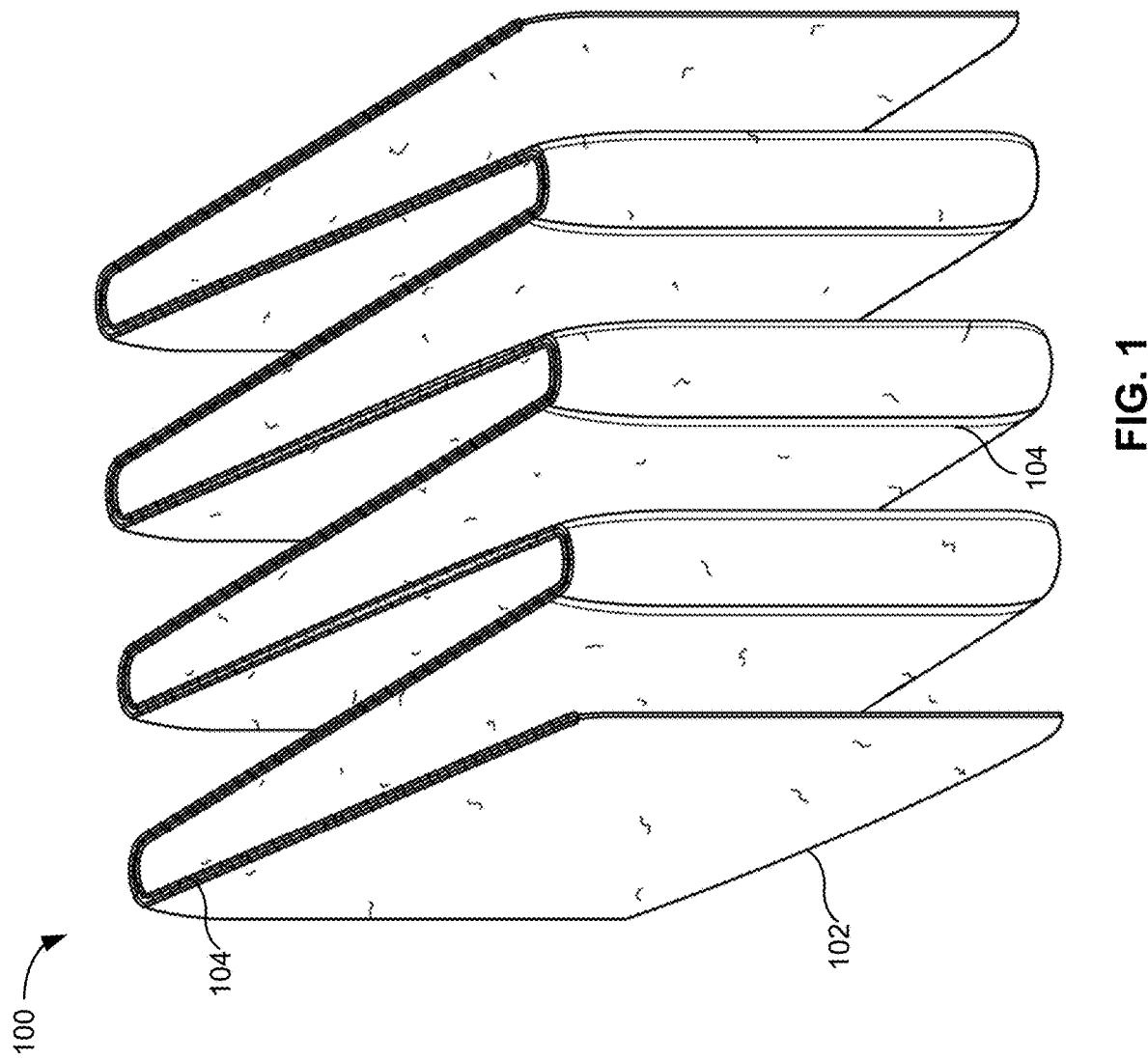
FIG. 1 illustrates a top perspective view of an example filter media pack, in accordance with the disclosed technology.

The present disclosure relates generally to filters and filter assemblies for filtering particulates from air and, more particularly, for filtering paint particulates from air. The disclosed technology, for example, can include an air filter box having a filter media pack and a filter housing. The filter media pack can be placed inside of the filter housing to form the air filter box and used to filter particulates from a mixture of air and particulates to create filtered air. For example, the filter box can be used with an air filtration system of a paint booth to filter paint particulates that often result from paint overspray during the painting process. The mixture of air and particulates can be passed through the air filter by the air filtration system to create filtered air. In some examples, more than one filter box can be assembled in a housing to form a filter assembly having multiple filter boxes.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of being a filter and filter assembly for filtering paint overspray particulates from air. The present disclosure, however, is not so limited, and can be applicable in other air filtering contexts. The present disclosure, for example and not limitation, can include filters and filter assemblies used in other types of air filtration systems. For example, and not limitation, the disclosed technology can be used in residential air filtration or other industrial and manufacturing air filtration systems (e.g., air filtration for metal working, wood working, composites finishing, foundries, etc.) or any other type of air filtration system used to filter particles from the air. Such implementations and applications are contemplated within the scope of the present disclosure. Accordingly, when the present disclosure is described in the context of being a filter and filter assembly for capturing paint overspray, it will be understood that other implementations can take the place of those referred to. Furthermore, when reference is made to air being the fluid that particulates are filtered from, it will be understood that other fluids can take the place of air depending on the particular application.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described. As will be described in greater detail, the present disclosure includes filters and filter assemblies for capturing particulates from air and, more particularly, to capturing paint overspray commonly resulting from use of aerosol paints and paint spray guns.

As depicted in FIG. 1, the disclosed technology can include a filter media pack 100 having a filter layer 102. The filter layer 102 can be a continuous piece of filter material and be configured to be folded along its length to a more compact configuration. For example, the filter media pack 100 can be folded to a compact configuration when shipped or stored and unfolded, or at least partially unfolded, to be deployed as an air filter. The filter layer 102 can be made from any suitable type of filter media that is capable of filtering particulates from air or other fluids. For example, the filter layer 102 can be made from lofted or non-woven polyester, lofted or non-woven polypropylene, filament fiberglass, polyurethane foam, electrostatic polypropylene, shredded paper, cardboard, cotton, or any other suitable filter media for the particular application. No matter the material that the filter layer 102 is made from, the filter layer 102 can be configured to allow air (or other gases) to pass through the filter while particulates suspended in the air can be filtered from the air. Furthermore, the filter layer 102 can also be treated with a flame retarding agent, activated carbon, tackifier or other post-manufacturing treatment that can help to enhance the effectiveness and/or longevity of the filter layer 102.

The filter media pack 100 can include one or more seams 104 at various locations along the filter layer 102. The seam 104, for example, can be formed along an outer edge of the filter layer 102 and at locations where the filter layer 102 is likely to be bent either for storage or for use. The seam 104 can help to increase the durability of the filter layer 102. For example, if the seam 104 is formed along an outer edge of the filter layer 102, the seam 104 can help to keep the filter layer 102 together when, for example, the filter layer is made from lofted polyester. The seam 104 can be formed using any suitable means of forming the seam 104. For example, the seam 104 can be formed by thermal bonding, stitching, glue, fasteners, or any other suitable manufacturing method of forming the seam 104.

Figure 2B:
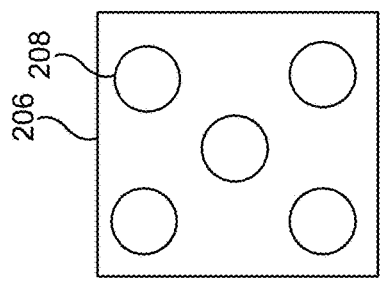
FIG. 2B illustrates a side view of an example filter media support, in accordance with the disclosed technology.
Figure 2C:
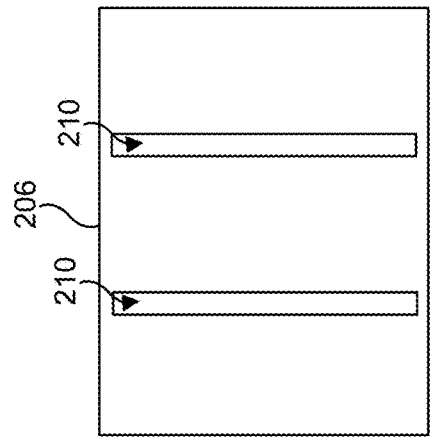
FIG. 2C illustrates a side view of an example filter media support, in accordance with the disclosed technology.
Figure 2A:
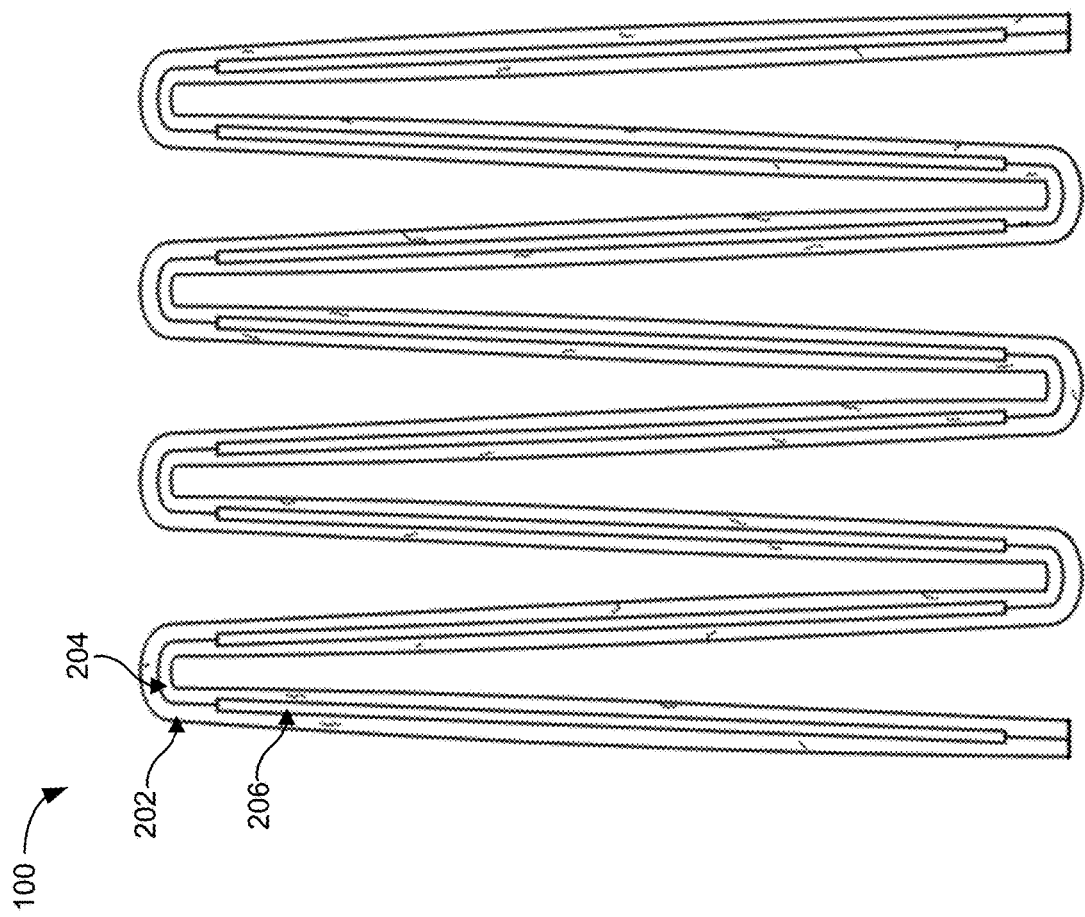
FIG. 2A illustrates a top view of an example filter media pack, in accordance with the disclosed technology.

FIG. 2A illustrates a top view of an example filter media pack 100, in accordance with the disclosed technology. As depicted in FIG. 1, in some examples, the filter media pack 100 can include multiple filter layers to increase the effectiveness of the filter media pack 100. For example, the filter media pack 100 can have a first filter layer 202 and a second filter layer 204 bonded together to form the filter media pack 100. If the filter media pack 100 has more than a single filter layer, the filter media pack 100 can be made from multiple different types of filter media. For example, the first filter layer 202 can be made from a lofted polyester having a first density while the second filter layer 204 can be made from a lofted polyester having a second density. In other examples, the first filter layer 202 can be made from a lofted polyester while the second filter layer 204 can be made from fiberglass. As will be appreciated by one of skill in the part, the filter media pack 100 can be made from multiple layers of filter media being made from various materials and having various material properties to increase the effectiveness of the filter media pack 100 for the particular application.

As depicted in FIG. 2A, the filter media pack 100 can include a filter media support 206 that can be bonded between the first filter layer 202 and the second filter layer 204. The filter media support 206 can be configured to provide support to the first filter layer 202 and the second filter layer 204. For example, the filter media support 206 can provide support and stability to the filter media pack 100 when the filter media pack 100 experiences a differential pressure caused by the air filtration system when the filter media pack 100 is used to filter particulates from air. The filter media support 206 can be made from supportive material such as cardboard, plastics, PVC, metals, composite materials, or any other suitable material for the application.

In some examples, and as depicted in FIG. 2A, the filter media support 206 can be installed between the first filter layer 202 and the second filter layer 204 along portions of the filter media pack 100 intended to remain linear while the filter media support 206 can be absent from portions of the filter media pack 100 intended to be bent. By doing so, the filter media supports 206 can provide support to the filter media pack 100 along lengths of the filter media pack 100 that are likely to need the most support while also facilitating folding of the filter media pack 100 where the filter media supports 206 are absent. Additionally, because the filter media supports 206 can be made of a non-breathable material the filter media supports 206 can prevent a mixture of air and particulates from passing through the filter media pack 100 at locations where the filter media supports 206 are installed. Therefore, by not installing filter media supports 206 at various locations of the filter media pack 100, the filter media supports 206 can channel or direct the flow of a mixture of air and particulates through the filter media pack 100 at the locations where the filter media support is absent. For example, the filter media pack 100 depicted in FIG. 2A can permit the mixture of air and particulates to pass through the filter media pack 100 at the locations where the filter media support 206 is absent (e.g., at either end and each bend location of the filter media pack 100). As will be appreciated by one of skill in the art, by causing the mixture of air and particulates to pass through the filter media pack 100 at specific locations, the filter media pack 100 can be configured to channel the flow of air and particulates such that the filter media pack 100 collects or captures particulates without prematurely clogging. For example, the filter media pack 100 can be configured with greater gaps between the filter media supports 206 at a back of the filter media pack 100 (nearer an outlet of the filter box described in greater detail herein) than gaps between the filter media supports 206 at the front of the filter media pack 100 (nearer an inlet of the filter box described in greater detail herein). In this way, the filter media pack 100 can be configured to channel or direct the flow of the air and particulates toward a back portion of the filter media pack 100 such that particulates are collected along the length of the filter media pack 100 rather than concentrated at a front portion of the filter media pack 100 which could lead to a premature clogging of the filter media pack 100.

FIGS. 2B and 2C illustrate side views of other example filter media supports 206, in accordance with the disclosed technology. As depicted in FIG. 2B, the filter media support 206 can include apertures 208 that can help to channel a mixture of air and particulates through the filter media pack 100 at the locations of the apertures 208. Similarly, as depicted in FIG. 2C, the filter media supports 206 can include slots 210 that can help to channel a mixture of air and particulates through the filter media pack at the locations of the slots 210. The filter media supports 206 can be further configured such that a greater concentration of the apertures 208 or the slots 210 can be positioned nearer a back portion of the filter media pack 100 (or nearer an exit of the filter box described further herein) such that a greater portion of the mixture of air and particulates is directed along the length of the filter media pack 100 rather than concentrated at a front portion of the filter media pack 100 which could lead to a premature clogging of the filter media pack 100. Alternatively, if it is desirable to collect a greater amount of the particulates nearer a front portion of the filter media pack 100, or a middle portion of the filter media pack 100, the filter media supports 206 can have a greater concentration of the apertures 208 or the slots 210 near the front or middle portions of the filter media pack.

Figure 3:
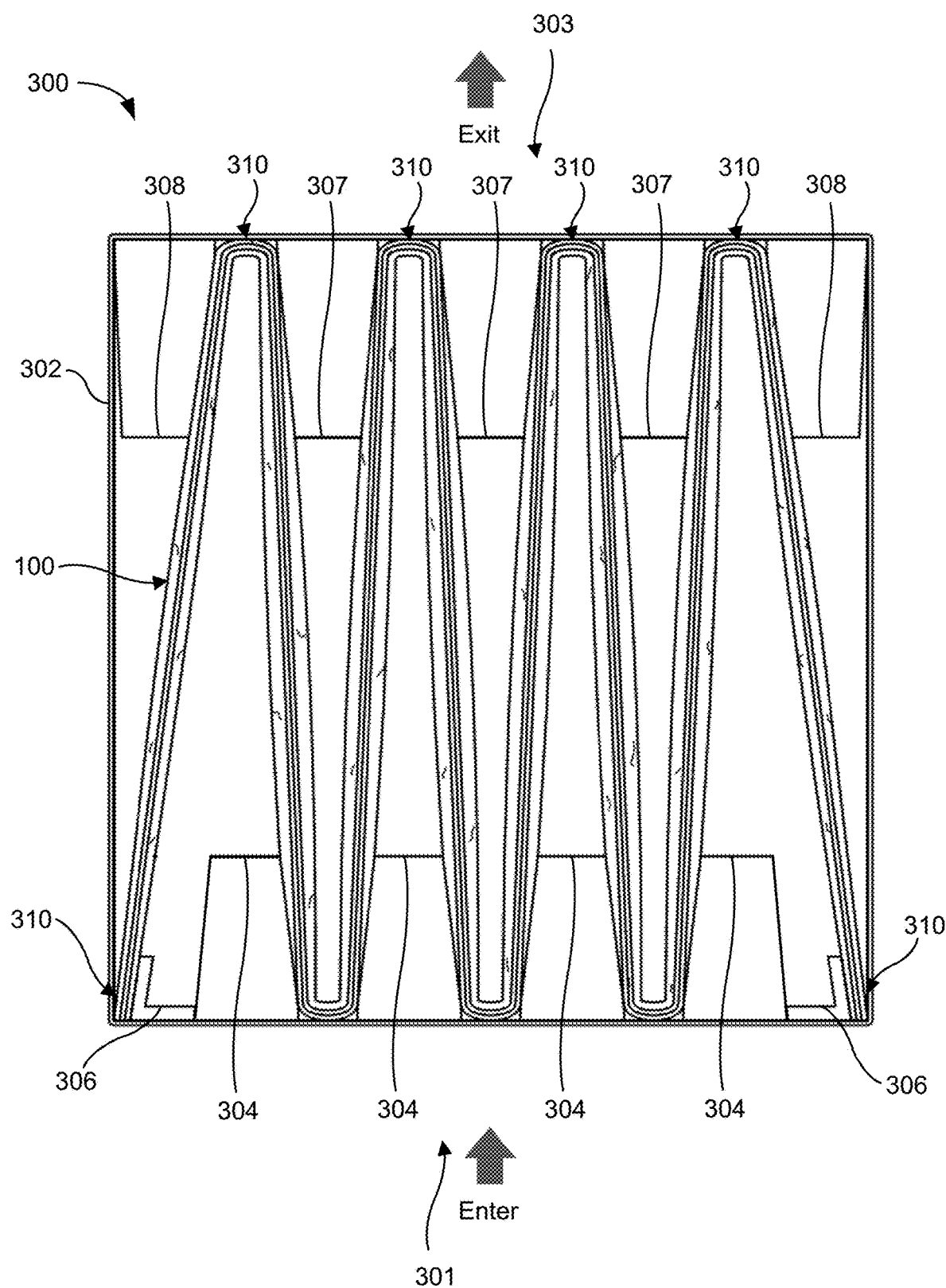
FIG. 3 illustrates a top view of an example filter box, in accordance with the disclosed technology.

The filter media pack 100 can be inserted into a filter housing 302 as depicted in FIG. 3 to form a filter box 300. FIG. 3 illustrates a top view of an example filter box 300, in accordance with the disclosed technology. The filter box 300 depicted in FIG. 3 is shown with a top of the filter box 300 opened such that the internal portions of the filter box 300 are visible. As depicted in FIG. 3, the filter housing 302 can receive and support the filter media pack 100 to form the filter box 300. Furthermore, as depicted in FIG. 3, the air and particulate mix can be configured to enter a first side of the filter box 300 (e.g., at an inlet 301) and exit the filter box 300 at an opposite side of the filter box 300 (e.g., at an outlet 303). As the air and particulate mix passes through the filter media pack 100, the particulates can be captured by, or adhere to, the filter media pack 100 such that filtered air can be released at the outlet 303. The filtered air can be released to the atmosphere, recirculated back through the paint booth, or directed by the air filtration system through further filtering before being released to the atmosphere or recirculated back through the paint booth. Although depicted as having greater spaces between ends of the filter media pack 100 and a nearest bend of the filter media pack 100 than neighboring bends of the filter media pack, the filter housing 302 can be configured to have approximately equal spacing between the ends of the filter media pack 100 and each of the bends of the filter media pack 100.

The filter media pack 100 can be shaped in an alternating "V" wedge configuration (e.g., a zig-zag) inside of the filter housing 302. However, the filter media pack 100 can be formed in many different configurations to fit the particular application. As a non-limiting example, the filter media pack 100 can be folded over on itself during storage and shipment and then extended outward like an accordion when deployed in the filter housing 302 forming the alternating "V" wedge configuration. In some examples, the filter media pack 100 can be inserted into the filter housing 302 in the alternating "V" wedge configuration such that the widest part (i.e., the top portion of the "V") faces the entering air side.

To prevent air and particulates from escaping around the filter media pack 100 when the filter media pack 100 is assembled in the filter housing 302, the filter media pack 100 can be sized slightly larger than the internal spacing of the filter housing 302 such that the filter media pack 100 is compressed or bent by the filter housing 302 to form a friction fit gasket 310. In this way, the filter media pack 100 can form a tight seal along each of the edges of the filter media pack 100 that come into contact with the filter housing 302. As will be appreciated by one of skill in the art, this can include the top and bottom portions of the filter media pack 100 contacting a top and bottom portion of the filter housing 302 (i.e., the portions of the filter media pack 100 and filter housing 302 that are positionally located into and out of the plane (or page) of FIG. 3) as well as the portions of the filter media pack 100 that contact a front and back portion of the filter housing 302 (i.e., the upper and lower portions of the filter media pack 100 and the filter housing 302 as depicted in FIG. 3).

The filter housing 302 can include one or more portions that are configured to support and align the filter media pack 100 inside of the filter housing 302. For example, the filter housing 302 can include inlet guide fingers 304, inlet support tabs 306, outlet guide fingers 307, and outlet support tabs 308 (collectively, "the Support Tabs"). As will be explained in greater detail herein, the Support Tabs can each be part of the material that makes up the filter housing 302 and can be configured to fold inwardly from an outer surface of the filter housing 302. The Support Tabs can each be sized and positioned such that each of the Support Tabs contact an edge of the filter media pack 100 and help to support the filter media pack 100 when a force is applied to the filter media pack 100 (e.g., when a pressure differential is applied to the filter media pack 100 from an air filtration system to cause the mixture of air and particulates to pass through the filter media pack 100). In this way, the Support Tabs can be configured to prevent movement of the filter media pack 100 when a force is applied to the filter media pack 100 and ensure the mixture of air and particulates passes through the filter media pack 100 rather than around it.

The inlet guide fingers 304 can be sized and positioned such that the inlet guide fingers 304 contact an edge of a front surface (i.e., the surface facing the inlet 301) of the filter media pack 100 near bends in the middle portion of the filter media pack and help to support the filter media pack 100 when a force is applied to the filter media pack 100. The inlet guide fingers 304 can be sized such that the filter media pack 100 can contact the inlet guide fingers 304 along an edge of the inlet guide fingers 304. Furthermore, the inlet guide fingers 304 can be sized and positioned to ensure the filter media pack 100 is aligned or positioned properly within the filter housing 302.

The inlet support tabs 306 can be sized and positioned such that the inlet support tabs 306 can fold inwardly and contact the filter media pack 100 near an end of the filter media pack 100. The filter media pack 100 and the filter housing 302 can be configured such that the ends of the filter media pack 100 can be tucked behind an edge of the filter housing 302 proximate the inlet 301 and the inlet support tabs 306 can help to keep the ends of the filter media pack 100 tucked behind the edge of the filter housing 302. In this way, the inlet support tabs 306 can help to ensure the filter media pack 100 is pressed against an edge of the filter housing 302 such that the filter media pack 100 remains in place and the mixture of air and particulates is prevented from escaping around the filter media pack 100.

The outlet guide fingers 307 can be sized and positioned such that the outlet guide fingers 307 contact an edge of a rear surface (i.e., the surface facing the outlet 303) of the filter media pack 100 near bends in the middle portion of the filter media pack and help to support the filter media pack 100 when a force is applied to the filter media pack 100. The outlet guide fingers 307 can be sized such that the filter media pack 100 can contact the outlet guide fingers 307 along a length of the outlet guide fingers 307. Furthermore, similar to the inlet guide fingers 304, the outlet guide fingers 307 can be sized and positioned to ensure the filter media pack 100 is aligned or positioned properly within the filter housing 302.

The outlet support tabs 308 can be sized and positioned such that the outlet support tabs 308 can fold inwardly and contact the rear surface (i.e., the surface facing the outlet 303) of the filter media pack 100 near outer ends of bends in the middle portion of the filter media pack 100. The outlet support tabs 308 can help to support the filter media pack 100 when a force is applied to the filter media pack 100.

Figure 4A:
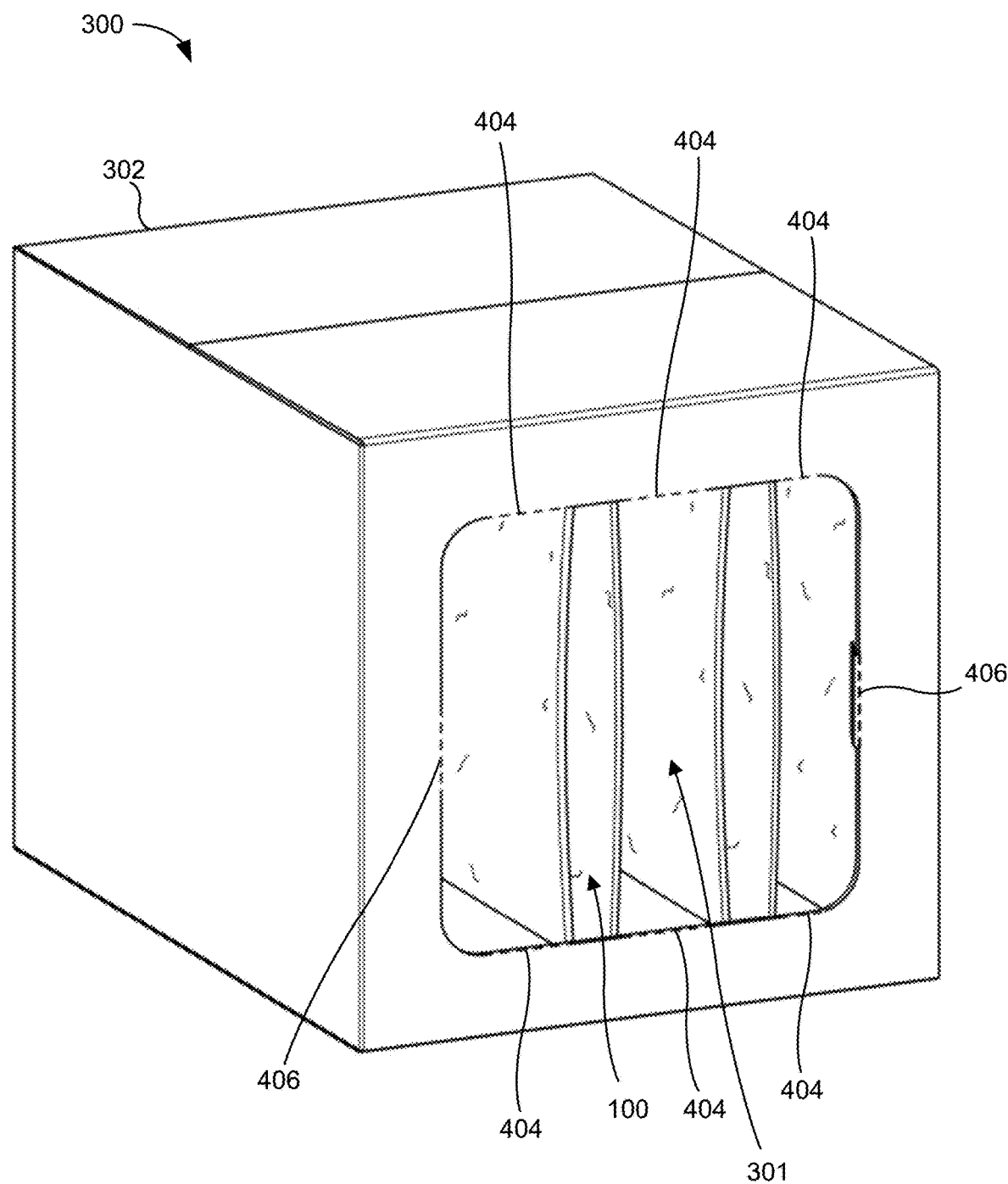
FIG. 4A illustrates a front perspective view of an example filter box, in accordance with the disclosed technology.

FIG. 4A illustrates a front perspective view of the filter box 300, in accordance with the disclosed technology. As depicted in FIG. 4A, the filter housing 302 can enclose the filter media pack 100 to form the filter box 300. The inlet 301 can be formed from material forming a wall of the filter box 300 and can be sized and positioned to permit a mixture of air and particulates to pass through the filter box 300 to create filtered air by passing through the filter media pack 100.

As depicted in 4A, and as will be described in greater detail herein, the inlet guide fingers 304 can include inlet guide finger perforations 404 that can facilitate the inlet guide fingers 304 being folded inwardly into the filter housing 302 to form the inlet 301 and position the inlet guide fingers 304 to engage the filter media pack 100. Similarly, the inlet support tabs 306 can include inlet support tab perforations 406 that can facilitate the inlet support tabs 306 being folded inwardly into the filter housing 302 to form the inlet 301 and position the inlet support tabs 306 to engage the filter media pack 100. The inlet guide finger perforations 404 and the inlet support tab perforations 406 can be sized such that a user can push the inlet guide fingers 304 and the inlet support tabs 306 inwardly without tearing the filter housing 302.

Figure 4B:
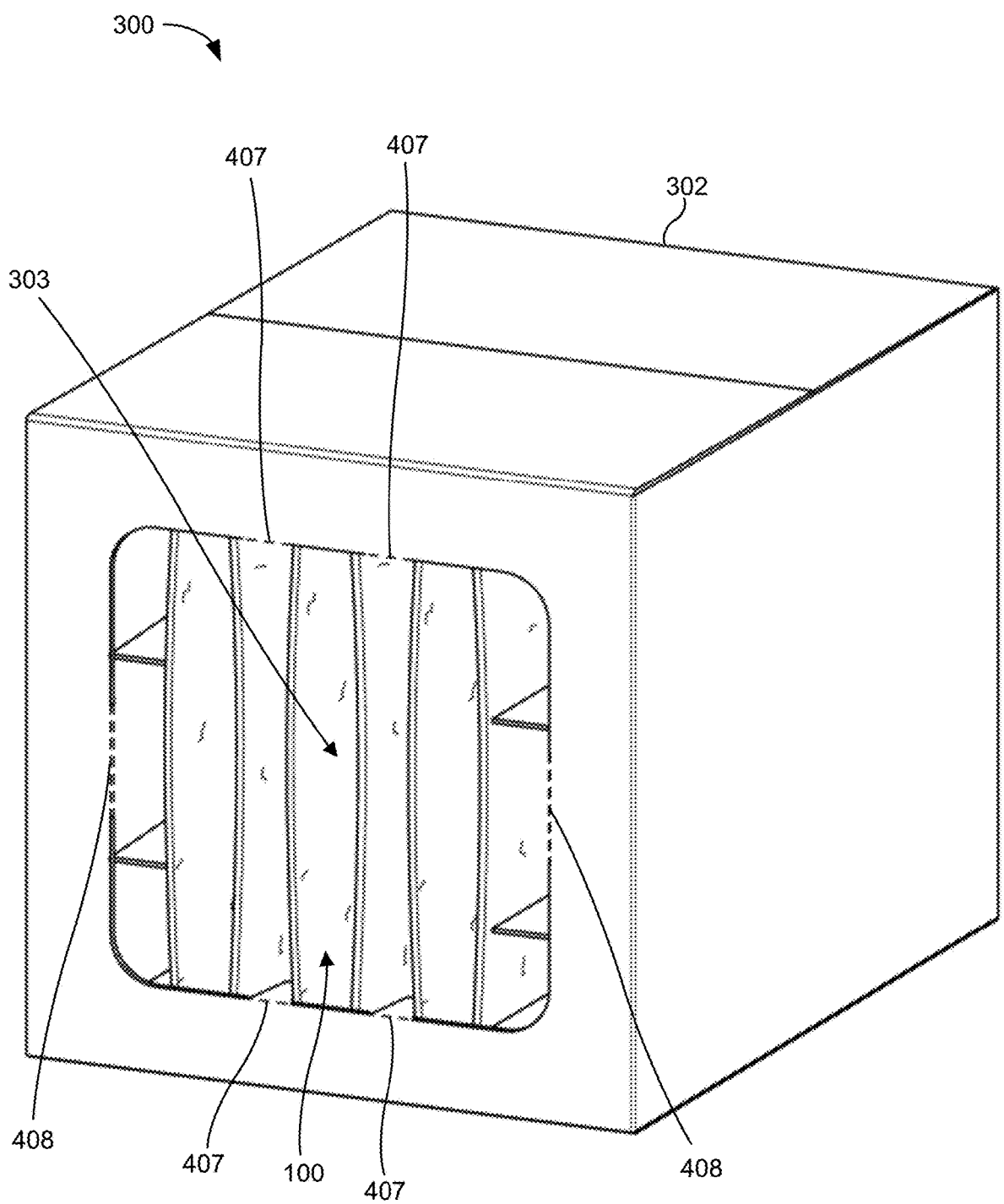
FIG. 4B illustrates a rear perspective view of an example filter box, in accordance with the disclosed technology.

FIG. 4B illustrates a rear perspective view of the filter box 300, in accordance with the disclosed technology. As depicted in FIG. 4B, the filter housing 302 can enclose the filter media pack 100 to form the filter box 300. The outlet 303 can be formed from material forming a wall of the filter box 300 and can be sized and positioned to permit a mixture of air and particulates to pass through the filter box 300 to create filtered air by passing through the filter media pack 100.

As depicted in 4B, and as will be described in greater detail herein, the outlet guide fingers 307 can include outlet guide finger perforations 407 that can facilitate the outlet guide fingers 307 being folded inwardly into the filter housing 302 to form the outlet 303 and position the outlet guide fingers 307 to engage the filter media pack 100. Similarly, the outlet support tabs 308 can include outlet support tab perforations 408 that can facilitate the outlet support tabs 308 being folded inwardly into the filter housing 302 to form the outlet 303 and position the outlet support tabs 308 to engage the filter media pack 100. The outlet guide finger perforations 407 and the outlet support tab perforations 408 can be sized such that a user can push the outlet guide fingers 307 and the outlet support tabs 308 inwardly without tearing the filter housing 302.

Figure 5A:
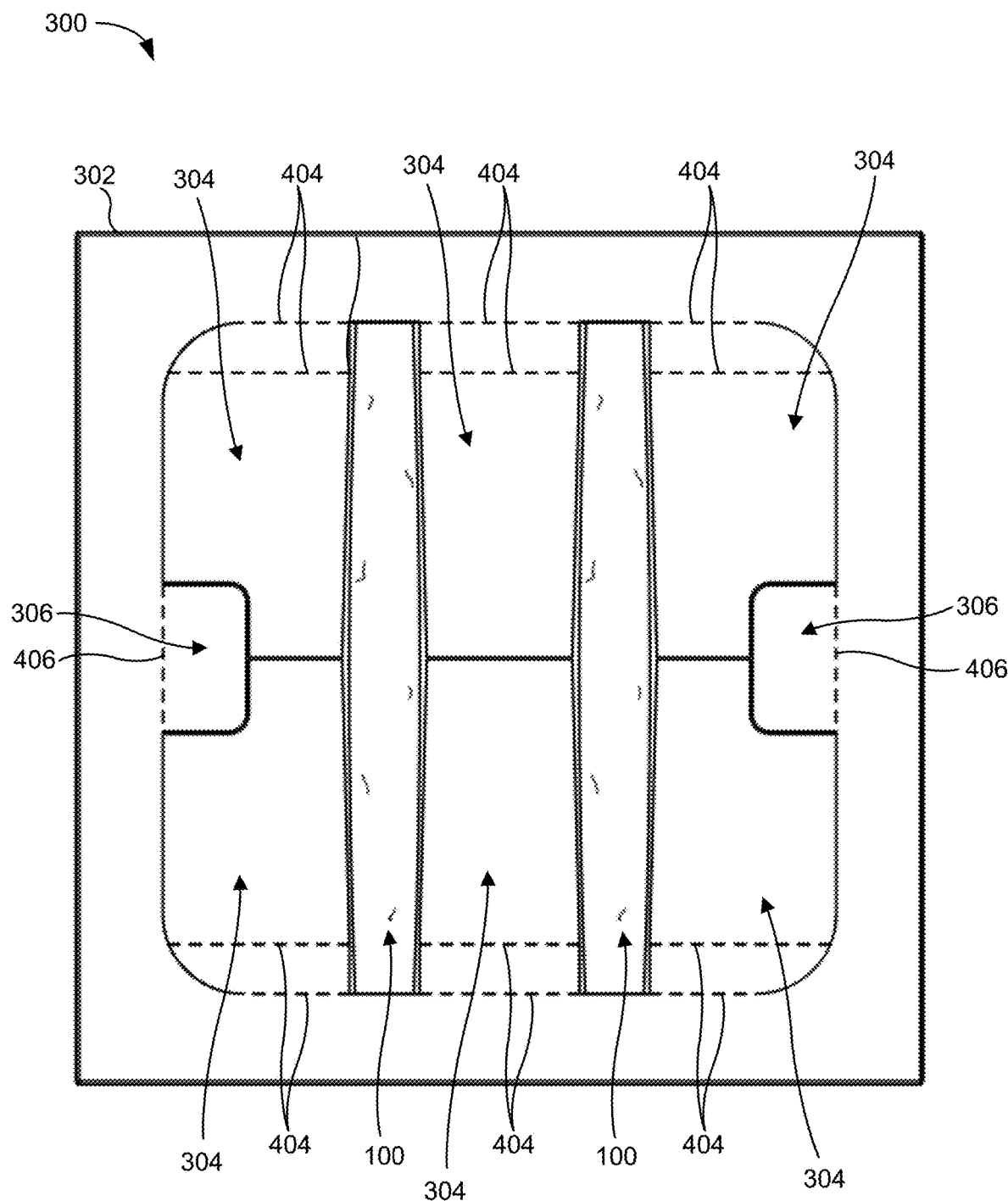
FIG. 5A illustrates a front view of an example filter box, in accordance with the disclosed technology.

FIG. 5A illustrates a front view of a filter box 300, in accordance with the disclosed technology. The filter box 300 illustrated in FIG. 5A depicts the inlet guide fingers 304 and the inlet support tabs 306 before the inlet guide fingers 304 and the inlet support tabs 306 are pushed inwardly to form the inlet 301. As depicted, the inlet guide fingers 304 can each include at least two sets of inlet guide finger perforations 404 to facilitate the inlet guide fingers 304 being pushed inwardly to form the inlet 301. By including at least two sets of inlet guide finger perforations 404, the inlet guide fingers 304 can be better able to engage the filter media pack 100 while allowing greater spacing for the inlet 301. The inlet support tabs 306 can include at least one set of inlet support tab perforations 406 such that the inlet support tabs 306 can be pushed inwardly and engage the filter media pack 100 near the ends of the filter media pack 100 to help keep the filter media pack 100 in place.

Figure 5B:
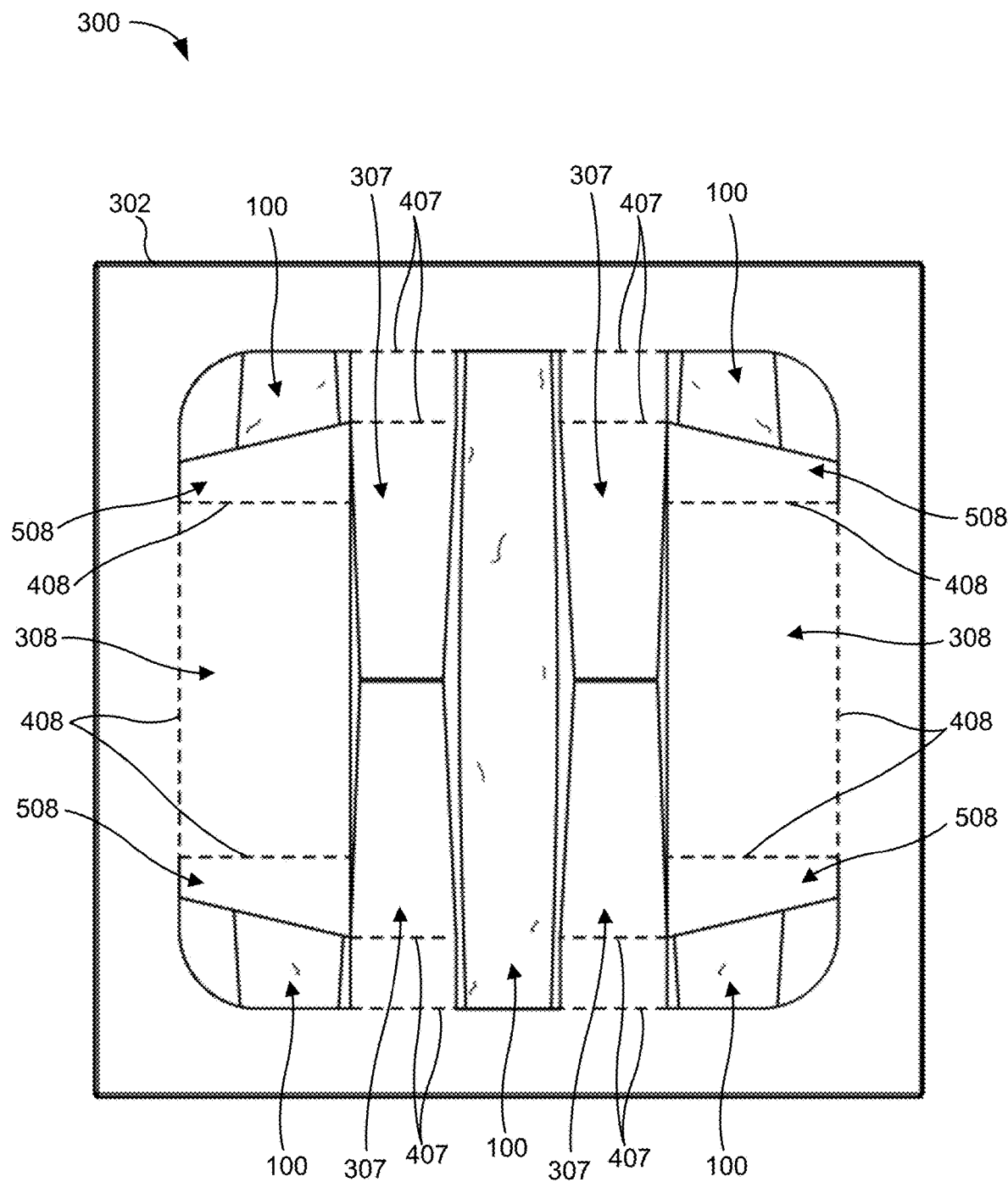
FIG. 5B illustrates a rear view of an example filter box, in accordance with the disclosed technology.

FIG. 5B illustrates a front view of a filter box 300, in accordance with the disclosed technology. Similar to FIG. 5A, the filter box 300 illustrated in FIG. 5B depicts the outlet guide fingers 307 and the outlet support tabs 308 before the outlet guide fingers 307 and the outlet support tabs 308 are pushed inwardly to form the inlet 301. As depicted, the outlet guide fingers 307 can each include at least two sets of outlet guide finger perforations 407 to facilitate the outlet guide fingers 307 being pushed inwardly to form the outlet 303. By including at least two sets of outlet guide finger perforations 407, the outlet guide fingers 307 can be better able to engage the filter media pack 100 while allowing greater spacing for the outlet 303.

The outlet support tabs 308 can include outlet support tab extensions 508 that can be folded inwardly and horizontally to engage the filter media pack 100. The outlet support tab extensions 508 can be formed by the outlet support tabs 308 including at least three sets of outlet support tab perforations 408—one of which can facilitate the outlet support tabs 308 being pushed inwardly into the filter box 300 while the other two outlet support tab perforations 408 can facilitate the outlet support tab extensions 508 being oriented horizontally to engage and help to support the filter media pack 100.

Figure 6:
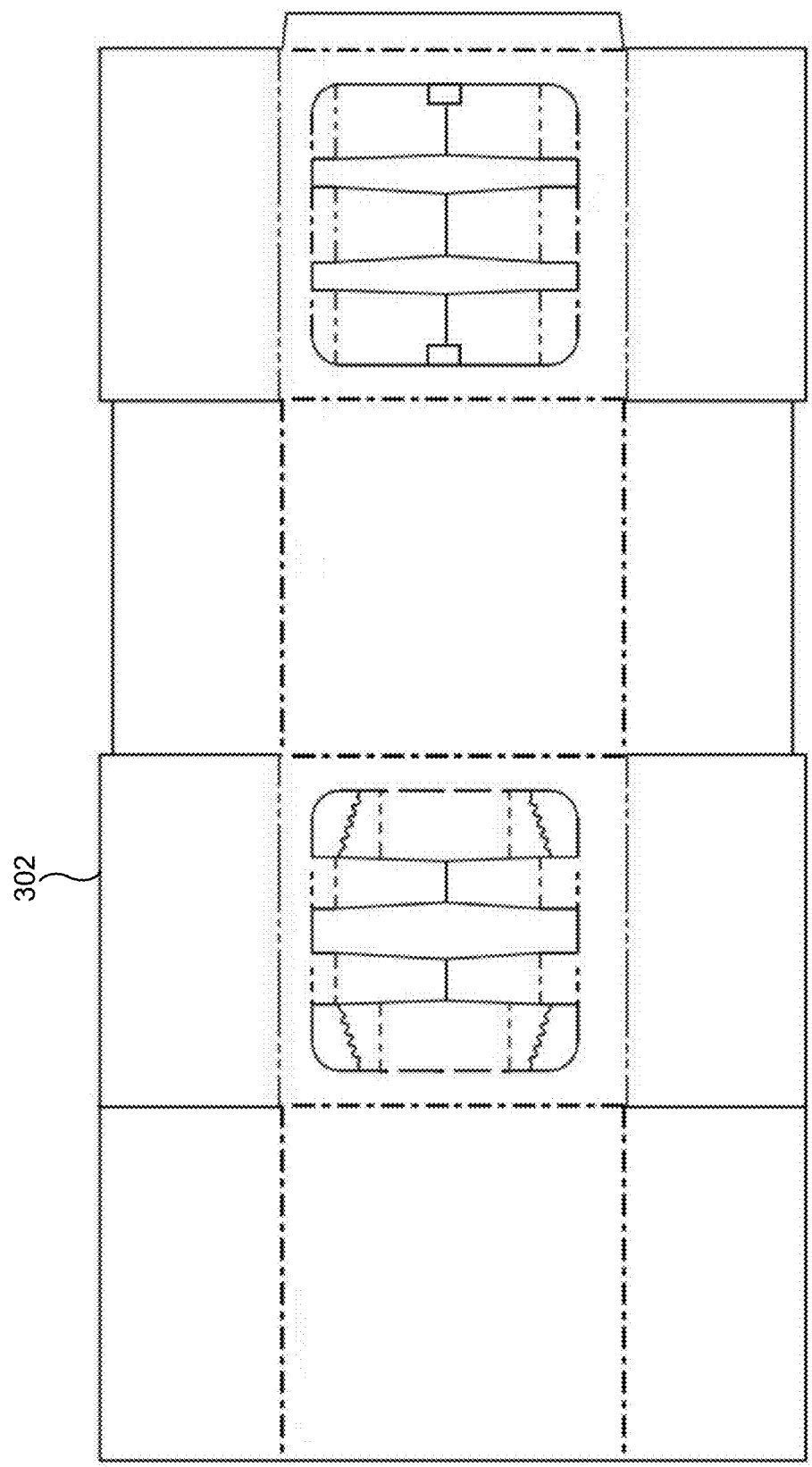
FIG. 6 illustrates a top view of a filter housing in an unassembled state, in accordance with the disclosed technology.

FIG. 6 illustrates a top view of an example filter housing 302 in an unassembled state, in accordance with the disclosed technology. As depicted in FIG. 6, in some examples the filter housing 302 can be made from a single piece of material. For example, the filter housing 302 can be made from a single piece of cardboard and be configured such that the filter housing 302 can be folded from an unassembled state (as depicted in FIG. 6) to the assembled state (as depicted in FIGS. 4A-5B). In this way, the filter housing 302 can be configured to be generally flat when in an unassembled state which can require less space when the filter housing 302 is stored or shipped. Furthermore, as will be appreciated by one of skill in the art, if the filter housing 302 is made from a single piece of cardboard, the filter housing 302 can be made using a cutting die, a cutting machine, or other similar manufacturing processes for manufacturing cardboard boxes. Alternatively, the filter housing 302 can be made from multiple pieces of material affixed to each other to form the filter housing 302.

The filter box 300, as described previously, can be installed in a location where a mixture of air and particulates is directed from a paint booth to ensure particulates in the air are filtered from the air prior to the air being released to the environment or recycled back through the paint booth. A single filter box 300 can be used for smaller filtration applications and multiple filter boxes 300 can be used for larger filtration applications. Furthermore, the size and shape of the filter box 300 can be varied as appropriate for the particular application. For example, the filter box 300 can be smaller for air filtration systems having a relatively low filtration capacity and larger for air filtration systems having a relatively high filtration capacity.

Figure 7:
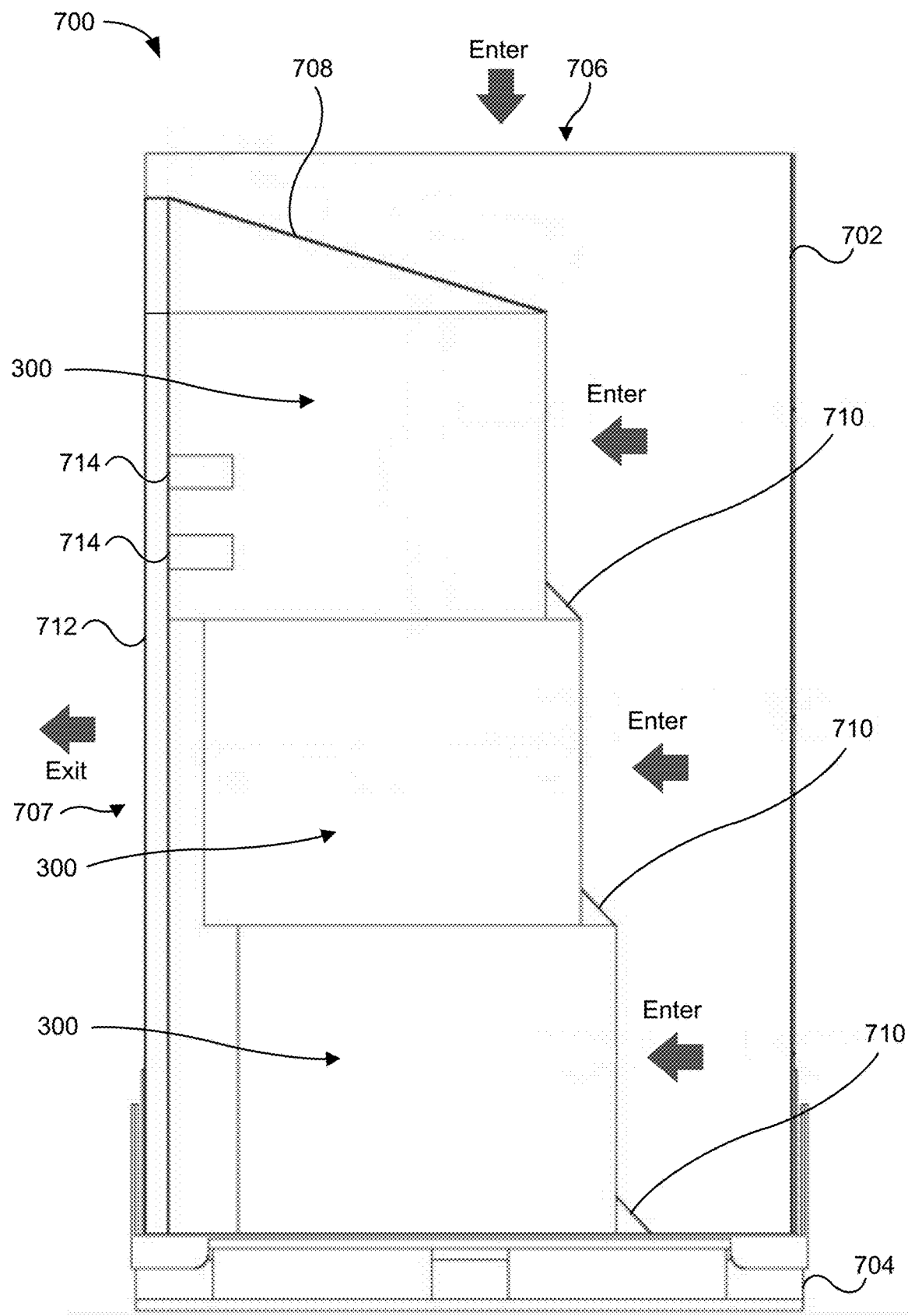
FIG. 7 illustrates a side view of an example air filter assembly, in accordance with the disclosed technology.

In some examples, more than one filter box 300 can be assembled together to form a filter assembly 700 as depicted in FIG. 7. The filter assembly 700 can be installed in an air filtration system for filtering particulates from a mixture of particulates and air. For example, the filter assembly 700 can be formed by multiple filter boxes 300 being placed within a filter assembly housing 702 to create a filter assembly 700 to be installed in an air filtration system. As a specific example, and as depicted in FIG. 7, multiple filter boxes 300 can be stacked vertically within a filter assembly housing 702 configured to direct air from the filter assembly inlet 706 located at a top portion of the filter assembly housing 702, through the filter boxes 300, and out a filter assembly outlet 707 located at a side portion of the filter assembly housing 702. This configuration can be, for example, installed in air filtration systems that utilize a downdraft in a paint booth to capture particulates. The filter assembly 700 can be sized to fit existing air filtration systems such that a user can simply assemble the filter assembly 700, remove a used filter assembly 700, and replace the used filter assembly 700 with the newly assembled filter assembly 700. Depending on the application, replacing used filter assemblies 700 with new filter assemblies 700 can be accomplished when the air filtration system is shut down or while the air filtration system is still in operation.

In some examples, the filter assembly housing 702 for holding the multiple filter boxes 300 can be made from the same material used to make the supportive exterior of the filter box (e.g., cardboard, plastic, PVC, metals, composite materials, or any other suitable material for the application). The filter assembly housing 702 can be configured to form a nearly air-tight barrier around the filter boxes 300 such that the mixture of air and particulates is directed through the filter boxes 300 and not around them. Furthermore, the filter assembly housing 702 can be configured to have spacers and supports in predetermined locations such that the filter assembly housing 702 is able to help ensure the filter boxes 300 are properly spaced and supported when installed in the filter assembly housing 702. The filter assembly housing 702 can also include reinforcing material located where the filter assembly housing 702 is likely to be lifted and secured in the air filtration system. For example, the filter assembly housing 702 can have reinforcing tabs 714 located where a restraint device (e.g., pneumatic clamp, hydraulic clamp, manual clamp, or other device configured to keep the filter assembly 700 in place) is likely to grip the filter assembly housing 702 to hold the filter assembly 700 in place. Furthermore, the filter assembly housing 702 can be mounted on a base structure 704 that can be used to lift and move the filter assembly 700 with, for example, a pallet jack or forklift. For example, the base structure 704 can be a pallet, a wooden base, a reinforced cardboard base, a plastic base, or any other suitable type of base structure for the application.

If the filter boxes 300 are installed vertically together into a filter assembly housing 702 to form a filter assembly 700, the filter boxes can be offset horizontally, as depicted in FIG. 7, to facilitate improved air flow during use. As one of skill in the art will appreciate, under certain operating conditions, the filter box 300 nearest the filter assembly inlet 706 is likely to be the first to clog during use because a greater number of particulates will initially be directed through the filter box 300 nearest the filter assembly inlet 706. Furthermore, as particulates are collected on the filter box 300 nearest the filter assembly inlet 706, the particulates will build up and begin to restrict air flow through the filter box 300. If the particulates continue to build up, the passage between the filter box 300 and the filter assembly housing 702 can eventually be restricted and air flow reduced. Thus, by offsetting the filter boxes 300 horizontally such that the largest clearance between the filter box 300 and the filter assembly housing 702 is nearest the filter assembly inlet 706 and the smallest clearance between the filter box 300 and the filter assembly housing 702 is farthest from the filter assembly inlet 706, the mixture of air and particulates is able to reach the farthest filter box 300 from the filter assembly inlet 706 as the other filter boxes 300 become clogged during use. In other examples, due to comparatively higher operating air velocities, a filter box 300 further from the inlet 706 can clog during use before the other filter boxes 300. In this situation, particulates begin to collect on the remaining filter boxes 300 as the air and particulates are directed around the clogged filter box 300 and toward remaining unclogged filter boxes 300.

The filter assembly 700 can include a sloped edge 708 at the filter assembly inlet 706 air deflectors 710 between each filter box 300 to help improve air flow through the filter assembly 700. For example, as depicted in FIG. 7, the inlet can include a sloped edge 708 to help direct the air and particulates through the filter assembly inlet 706 and toward the filter boxes 300 as the mixture of air and particulates enter the filter assembly 700. The sloped edge 708 near the filter assembly inlet 706 can be sized and shaped as suitable for the particular application. Furthermore, as depicted in FIG. 7, the filter assembly 700 can include air deflectors 710 between each filter box 300 to eliminate a flat edge of a top portion of a filter box 300 resulting from the offset between the filter boxes 300 that could otherwise cause a greater pressure differential as air is directed through the filter assembly 700. The sloped edge 708 and the air deflectors 710 can be made from the same material as the filter assembly housing 702 (e.g., cardboard, plastic, PVC, metals, composite materials, or any other suitable material for the application) or the sloped edge 708 and the air deflectors 710 can be made from material that is different than the filter assembly housing 702 depending on the application.

The filter assembly 700 can further include a supplemental filter 712 that can be installed proximate the filter assembly outlet 707 to filter particulates that may escape past the filter boxes 300. For example, the supplemental filter 712 can be a sheet of filter media stretched across the filter assembly outlet 707. The supplemental filter 712 can be made from the same material as the filter layer 102 of the supplemental filter 712 can be made from material that is different than the filter layer 102.

The filter assembly 700 just described and depicted in FIG. 7 is offered only for illustrative purposes and should not be construed as limiting. As further non-limiting illustrative examples, the filter boxes 300 can be stacked horizontally (side-by-side) and placed in a filter assembly housing 702 for applications where it would be advantageous to filter the mixture of air and particulates that enters and exits the filter assembly 700 horizontally. In other examples, the filter boxes 300 can be positioned vertically (installed with the inlet 301 facing upwards and the outlet 303 downwards) for applications where it would be advantageous to filter a mixture of air and particulates that enters and exits the filter assembly 700 vertically. In yet other examples, the filter boxes 300 can be installed in series (one filter box 300 placed directly after another filter box 300) for applications where it would be advantageous to provide additional filtering. As one of skill in the part will appreciate, the disclosed technology can comprise many different configurations to fit a particular application. In each configuration, the many of the features previously described can be included such as each filter box 300 being offset from an adjacent filter box 300, a sloped edge 708, air deflectors 710, etc. Furthermore, the size and shape of the filter assembly 700 can be varied as appropriate for the particular application. For example, the filter assembly 700 can be smaller for air filtration systems having a relatively low filtration capacity and larger for air filtration systems having a relatively high filtration capacity. As a non-limiting example, the filter assembly 700 can have dimensions of 85 inches tall, 32.5 inches wide, and 48.375 inches depth.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. An air filter for filtering particulates from a mixture of air and particulates, the air filter comprising:
    a filter housing comprising a single planar sheet of cardboard configured to be folded from a relatively flat state to a deployed state, the filter housing comprising an inlet and an outlet; and
    a filter media pack disposed at least partially within the filter housing and configured to receive a mixture of air and particulates through the inlet and filter at least a portion of the particulates from the mixture of air and particulates to create filtered air directed through the outlet, at least a portion of the filter media pack extending at an oblique angle with respect to a direction extending from the inlet to the outlet, the filter media pack comprising:
        a filter layer comprising one or more filter sections; and
        a plurality of filter media supports disposed along the filter layer from approximately the inlet to approximately the outlet, the plurality of filter media supports being configured to support the filter layer,
        wherein a first filter media support of the plurality of filter media supports is spaced a distance apart from a second filter media support of the plurality of filter media supports nearest the inlet.

2. The air filter of claim 1, wherein the filter media pack is configured to be folded and placed inside of the filter housing for cooperative engagement with the filter housing.

3. The air filter of claim 2, wherein the filter media pack is configured to form a friction fit seal at an interface between the filter media pack and the filter housing, wherein the friction fit seal is configured to prevent the mixture of air and particulates from being directed around an outer edge of the filter media pack.

4. The air filter of claim 1, wherein at least one filter media support of the plurality of filter media supports comprises one or more openings configured to channel the mixture of air and particulates through the filter layer.

5. The air filter of claim 4, wherein the filter layer comprises a first filter layer, the filter media pack further comprising a second filter layer.

6. The air filter of claim 5, wherein at least one filter media support of the plurality of filter media supports is disposed at least partially between the first filter layer and the second filter layer.

7. The air filter of claim 1, wherein filter housing further comprises perforations at least partially defining the inlet and the outlet, the perforations configured to facilitate removal of the cardboard from the single planar sheet of cardboard to form the inlet and the outlet.

8. The air filter of claim 7, wherein the perforations further define one or more support tabs configured to be folded inwardly from at least the inlet to support the filter media pack inside of the filter housing.

9. The air filter of claim 1, wherein a third filter media support of the plurality of filter media supports is spaced a distance apart from a fourth filter media support of the plurality of filter media supports nearest the outlet.

10. The air filter of claim 9, wherein the distance between the first filter media support and the second filter media support is greater that the distance between the third filter media support and the fourth filter media support.

11. An air filter for filtering particulates from a mixture of air and particulates, the air filter comprising:
    a filter housing comprising a single planar sheet of cardboard configured to be folded from a relatively flat state to a deployed state, the filter housing comprising a plurality of perforations at least partially defining an inlet and an outlet, the perforations configured to facilitate removal of at least some of the cardboard from the single planar sheet of cardboard to form the inlet and the outlet; and
    a filter media pack disposed at least partially within the filter housing and configured to receive a mixture of air and particulates through the inlet and filter at least a portion of the particulates from the mixture of air and particulates to create filtered air directed through the outlet, the filter media pack comprising:
a filter layer comprising one or more filter sections; and
a plurality of filter media supports disposed along the filter layer from approximately the inlet to approximately the outlet, the plurality of filter media supports being configured to support the filter layer,
wherein a first filter media support of the plurality of filter media supports is spaced a distance apart from a second filter media support of the plurality of filter media supports nearest the inlet.

12. The air filter of claim 11, wherein the perforations further define one or more support tabs configured to be folded inwardly from at least the inlet to support the filter media pack inside of the filter housing.

13. The air filter of claim 12, wherein the one or more support tabs comprise an inlet guide finger configured to fold inwardly from a top or a bottom of a front outer wall of the filter housing to, at least partially, form the inlet.

14. The air filter of claim 12, wherein the one or more support tabs comprise an inlet support tab configured to fold inwardly from at least one side of a front outer wall of the filter housing to, at least partially, form the inlet.

15. The air filter of claim 12, wherein the one or more support tabs comprise an outlet guide finger configured to fold inwardly from a top or a bottom of a rear outer wall of the filter housing to, at least partially, form the outlet.

16. The air filter of claim 12, wherein the one or more support tabs comprise an outlet support tab configured to fold inwardly from at least one side of a rear outer wall of the filter housing to, at least partially, form the outlet.

17. An air filter for filtering particulates from a mixture of air and particulates, the air filter comprising:
a filter media pack configured to receive a mixture of air and particulates and filter at least a portion of the particulates from the mixture of air and particulates to create filtered air, the filter media pack comprising:
a filter layer comprising one or more filter sections; and
a plurality of filter media supports configured to support the filter layer; and
a filter housing configured to receive and support the filter media pack, the filter housing comprising a material configured to be folded from a relatively flat state to a deployed state and comprising a plurality of perforations at least partially defining an inlet and an outlet, the perforations configured to facilitate removal of at least a portion of the material to form the inlet and the outlet,
wherein the air filter is configured to channel the mixture of air and particulates from the inlet, through the filter media pack, and out the outlet to create the filtered air, and
wherein the plurality of filter media supports is disposed along the filter layer from approximately the inlet to approximately the outlet and a first filter media support of the plurality of filter media supports is spaced a distance apart from a second filter media support of the plurality of filter media supports nearest the outlet.

18. The air filter of claim 17, wherein at least a portion of the filter media pack extends at an angle with respect to a direction extending from the inlet to the outlet.

19. The air filter of claim 17, wherein at least one filter media support of the filter plurality of media supports comprises one or more openings configured to channel the mixture of air and particulates through the filter layer.

20. The air filter of claim 19, wherein the filter layer comprises a first filter layer, the filter media pack further comprising a second filter layer, the filter media support being disposed at least partially between the first filter layer and the second filter layer.

* * * * *